United States Patent [19]

Hoffman

[11] Patent Number: 4,658,199

[45] Date of Patent: Apr. 14, 1987

[54] CURRENT REGULATING CIRCUIT

[75] Inventor: Philip A. Hoffman, Towson, Md.

[73] Assignee: Solid State Charger Research and Development, Lutherville, Md.

[21] Appl. No.: 671,497

[22] Filed: Nov. 14, 1984

[51] Int. Cl.[4] ................................................ H02J 7/00
[52] U.S. Cl. ......................................... 320/21; 320/39
[58] Field of Search ...................... 320/21, 39, DIG. 2, 320/53

[56] References Cited

U.S. PATENT DOCUMENTS 3,543,127  11/1970  Fry et al. ............................. 320/39
4,321,523  3/1982  Hammel ............................. 320/21 X Primary Examiner—Patrick R. Salce
Assistant Examiner—Anita M. Ault
Attorney, Agent, or Firm—Leonard Bloom

[57] ABSTRACT

A current pulse producing, current regulating circuit includes a SCR arranged to pass a current pulse once each positive going half wave input supplied thereto. The SCR is controlled by a control circuit free of current feedback and timing circuitry and responsive to the an unfiltered, rectified A.C. input. The control circuit produces a firing signal, which is applied to the control electrode of the SCR, at a point during the downward swing of each positive going half wave input. The control circuit includes a OR function circuit responsive to the unfiltered rectified input applied to the control circuit and to an output from a circuit also responsive to the unfiltered rectified input; the last mentioned circuit having a hysteresis characteristic. The SCR may be operatively associated with a second SCR and arranged to fire it thereby producing higher amplitude current pulses. Battery charging and forming circuits, as well as off-line power supplies, incorporating the current regulating circuit are disclosed. The input to the control circuit may be either a full wave or a half wave rectified A.C. input. Batteries of different types and having different numbers of cells can be accomodated.

22 Claims, 25 Drawing Figures

CURRENT REGULATING CIRCUIT

FIELD OF THE INVENTION

The present invention relates to a current regulating circuit and, more particularly, to current pulse producing battery forming circuits, battery charging circuits and off-line power supplies incorporating the current regulating circuit.

BACKGROUND OF THE INVENTION

While not restricted thereto, this invention finds direct application in simple, inexpensive off-line power supply circuits and in simple, inexpensive battery charging and forming circuits which are especially useful for forming and/or charging batteries used in portable battery-operated devices, including cordless devices, such as soldering pencils, shavers, cordless telephones, calculators, computers, television sets, radios, recorders, electric garden tools, cordless hand tools including woodworking and metalworking tools, and the like. The present invention also finds direct application in off-line power supplies and in battery charging and forming circuits useful in aircraft, automobiles and other mobile machines, as well as in battery formers and chargers such as those used at aircraft repair facilities, automobile service stations and the like, and in battery forming circuits, battery charging circuits and in off-line power supplies of general application.

The terms battery charging and battery charger as used herein include respectively battery recharging and battery recharger as well, in accordance with contemporary usage of these terms.

Battery-operated devices, such as hand tools, have considerable popularity because of the convenience afforded by these devices. Many devices of this type are customarily provided with a small D.C. electric drive motor which is energized by one or more rechargeable batteries incorporated within the tool housing and operatively associated with the electric drive motor. When the device is a television set, radio, recorder or the like, the rechargeable batteries supply D.C. power to the circuits therein either exclusively or alternatively, in instances in which an A.C. power cord and plug are provided. The elimination of a conventional electric cord or its alternative use increases the freedom with which the user of the cordless device can move about, thereby overcoming the inconveniences of clearing the power cord from obstacles with which it may otherwise become entangled and reducing the necessity of having electric wall outlets available at every place the device is to be used. It has become customary to provide cordless devices, such as cordless garden tools and woodworking tools with rechargeable batteries, thus avoiding the necessity of frequent battery replacements, and to reduce the cost of operation.

It is known from U.S. Pat. No. 3,943,423 to Philip A. Hoffman entitled "Battery Charging Circuit" and issued on Mar. 9, 1976 to provide a battery charging circuit which, when recharging batteries in a hand tool or the like, needs simply to be connected to a conventional, 117 volt 60 Hz. household outlet and to the battery cell or cells which are to be recharged. Other outlet voltage levels and/or supply frequencies can be used as well. The known charging circuit of the aforesaid U.S. Pat. No. 3,943,423 to Philip A. Hoffman, supra, comprises a variable resistance switch preferably realized in the form of a junction transistor and Darlington-connected other transistors operatively associated with a feedback circuit. This known circuit, which produces current pulses twice each rectified half wave, requires negative feedback and has, in addition to the transistors, resistors, two rectifying diodes and two capacitors, resulting in a circuit which, particularly because of the need for feedback circuitry, capacitors and a considerable number of passive components becomes relatively expensive to realize. No provision has been made to adjust the circuit, once constructed, for different capacity loads.

It is known from the further U.S. Pat. No. 3,970,912 issued on July 20, 1976 to Philip A. Hoffman and entitled "Battery Charging Circuit" to provide a battery charging circuit operatively arranged to produce, twice each rectified half wave, current pulses which are supplied to the battery or batteries to be recharged via the inductance of an electric motor, which forms part of a cordless hand tool or the like. This circuit, while not requiring capacitors to operate, does require negative feedback and an inductance which is a portion of a motor, that is the inductance of an electric motor in a powered hand tool or the like. No provision has been made to adjust the circuit, once constructed, for different capacity loads.

An apparatus is known from the U.S. Pat. No. 4,134,056 to Katsuo Fukui et al. entitled "Apparatus for Charging a Battery" and granted Jan. 9, 1979 for charging batteries which involves a circuit having a differential amplifier, one of its inputs being fed from a circuit point between a point from a series connected capacitor and a resistor, its other input being fed via a resistive voltage divider connected across a fixed D.C. source. The capacitor and resistor are used as a differentiating circuit.

A battery charger and power supply is known from U.S. Pat. No. 4,321,523 to Ronald O. Hammel entitled "Battery Charger and Power Supply Circuitry" and granted Mar. 23, 1982 which includes a rectifier, a voltage regulator, a SCR switch, the switch being controlled by a timing circuit which fires the SCR at a selected point intermediate to the beginning and end of each rectified half wave. An operational amplifier, responsive to a reference voltage and battery voltage, provides one of the two inputs to the trigger circuit, its other input being from the voltage regulator. While current feedback is not used, the circuitry must include an accurate timing circuit.

Another battery charging circuit is known from U.S. Pat. No. 3,310,724 to Dennis R. Grafham entitled, "Battery Charging Regulators" granted Mar. 31, 1967 which includes a first controlled SCR. A second SCR, arranged to respond to the battery voltage level, controls the first SCR which conducts during peak portions of each half wave until the battery is sufficiently charged. An additional rectifier and variable resistor provide a trickle charge path.

A battery charging circuit is known from U.S. Pat. No. 3,867,681 to Larry D. Bishop et al. entitled "Battery Charging Circuit" granted Feb. 18, 1975 which includes a current regulator and a switch, the switch being controlled by a logic circuit, including an AND gate and two OR gates. An operational amplifier, responsive to a reference voltage and a battery voltage, provides one of the inputs to one of the OR gates, as well as to a control input of a latch circuit, the output of which is supplied to the second OR gate. Each OR gate receives its second input from respective timers.

A considerable number of battery chargers, as well as off-line power supplies have been proposed and are known from the general prior art including U.S. Patents identified as follows:

| Numbers   | Patentees         | Issue Date    |
|-----------|-------------------|---------------|
| 3,617,852 | Phoenix           | Nov. 2, 1971  |
| 3,735,233 | Ringle            | May 22, 1973  |
| 3,781,631 | Nelson et. al.    | Dec. 25, 1973 |
| 3,876,921 | Bigbee, III       | Apr. 8, 1975  |
| 3,919,617 | Tippett et al.    | Nov. 11, 1975 |
| 4,013,934 | Frye              | Mar. 22, 1977 |
| 4,019,111 | Bennefeld         | Apr. 19, 1977 |
| 4,128,798 | Takai             | Dec. 5, 1978  |
| 4,134,056 | Fukai et al.      | Jan. 9, 1979  |
| 4,140,958 | Groeschel         | Feb. 20, 1979 |
| 4,158,813 | Ellis et al.      | Jun. 19, 1979 |
| 4,162,439 | Schneider         | Jul. 24, 1979 |
| 4,186,335 | Cahill            | Jan. 29, 1980 |
| 4,220,905 | Quarton           | Sep. 2, 1980  |
| 4,266,178 | Asakaw            | May 5, 1981   |
| 4,292,578 | Steigerwald et al.| Sep. 29, 1981 |
| 4,342,955 | Gant              | Aug. 3, 1982  |
| 4,348,619 | Ray et al.        | Sep. 7, 1982  |
| 4,458,195 | Piteo             | Jul. 3, 1984. |

SUMMARY OF THE INVENTION

An object of the present invention is to provide an improved current regulating circuit useful in circuits for charging and forming batteries, and in off-line power supplies.

Another object of the invention is to provide a current regulating circuit which is simple and inexpensive.

An additional object of the invention is to provide a current regulating circuit which is simple, inexpensive, small and lightweight and which can be incorporated directly into a battery-operated device, as part of a battery charger or former.

A further object of the invention is to provide a simple, inexpensive battery forming or charging circuit which includes the current regulating circuit of the invention.

Yet another object of the invention is to provide an off-line power supply which utilizes the instant current regulating circuit.

Yet an additional object of the invention is to provide a current regulating circuit which effects the production of narrow current pulses without the need of timing circuits.

Yet a further object of the invention is to provide a battery charging and/or forming circuit which uses a current regulating circuit and which does not need timing circuits.

Still another object of invention is to provide an off-line power supply which uses a current regulating circuit and which does not require a timing circuit.

Still an additional object of the invention is to provide a current regulating circuit which effects the production of narrow current pulses without using current feedback.

Still an additional object of the invention is to provide a battery charging and/or forming circuit which uses a current regulating circuit and is free of current feedback.

Still a further object of the invention is to provide an off-line power supply which uses a current regulating circuit and is free of current feedback.

The foregoing objects, as well as others which are to become apparent from the text below, can be achieved in accordance with the present invention by providing a current regulating circuit which includes semiconductive switch means operatively arranged to supply current pulses to a load. The semiconductive switch means is coupled, in series with rectifier means and the load. The rectifier means supplies an unfiltered rectified input to the semiconductive switch means. A control circuit is arranged to produce a control signal to the semiconductive switch means which allows the switch means to become conductive at a point during the second half of each rectified half wave supplied to the semiconductive switch means.

In an important aspect, the invention is a battery charging or forming circuit which includes means across which a battery to be charged or formed is to be placed, and means for providing an unfiltered, rectified input. Control circuit means responsive to the unfiltered, rectified input are provided for developing a control signal during a portion of decreasing swings of the unfiltered, rectified input. Means responsive to the control signal are arranged for passing current pulses to the means across which a battery is to be placed during a portion of the decreasing swings.

The invention can also be viewed as an off line power supply which includes smoothing circuit means and means for providing an unfiltered, rectified input. Control circuit means responsive to the unfiltered, rectified input are provided for developing a control signal during a portion of decreasing swings of the unfiltered, rectified input. Means responsive to the control signal are arranged for developing current pulses during a portion of the decreasing swings, these means for developing current pulses including means for coupling the current pulse to the smoothing circuit means.

In its broad aspect, the invention is a current regulating circuit which includes means for providing an unfiltered, rectified input. Control circuit means responsive to the unfiltered, rectified input are provided for developing a control signal during decreasing swings of the unfiltered, rectified input. Means responsive to the control signal are arranged for passing current during a portion of the decreasing swings.

In preferred embodiments, the semiconductive switch means is a silicon-controlled-rectifier (SCR) which once each time it is turned on remains conductive until it is extinguished as a result of the rectified half wave input approaching zero.

In a second embodiment, the first SCR is fired by a second SCR which forms part of the current regulating circuit. In this case, the circuit is capable of supplying current pulses of higher amplitude.

In one aspect, the present invention can be regarded as a current regulating circuit as noted above.

An another aspect, the present invention is a battery forming and/or charging circuit incorporating the current regulating circuit.

In an additional aspect, the invention constitutes an improvement in a battery charger and/or former which includes the current regulating circuit.

The present invention can also be considered to be in an off-line power supply which incorporates the current regulating circuit.

The invention can be realized as a battery charger and/or former which is adjustable so as to be effective in charging and/or forming batteries constituted by one or a plurality of cells. For example, the battery charger and/or former can be adjusted to charge from one to sixteen cells and be used for both lead-acid batteries and nickel-cadmium (NICAD) batteries.

DETAILED DESCRIPTION OF THE PREFERRED EMBODIMENTS

Figure 1:
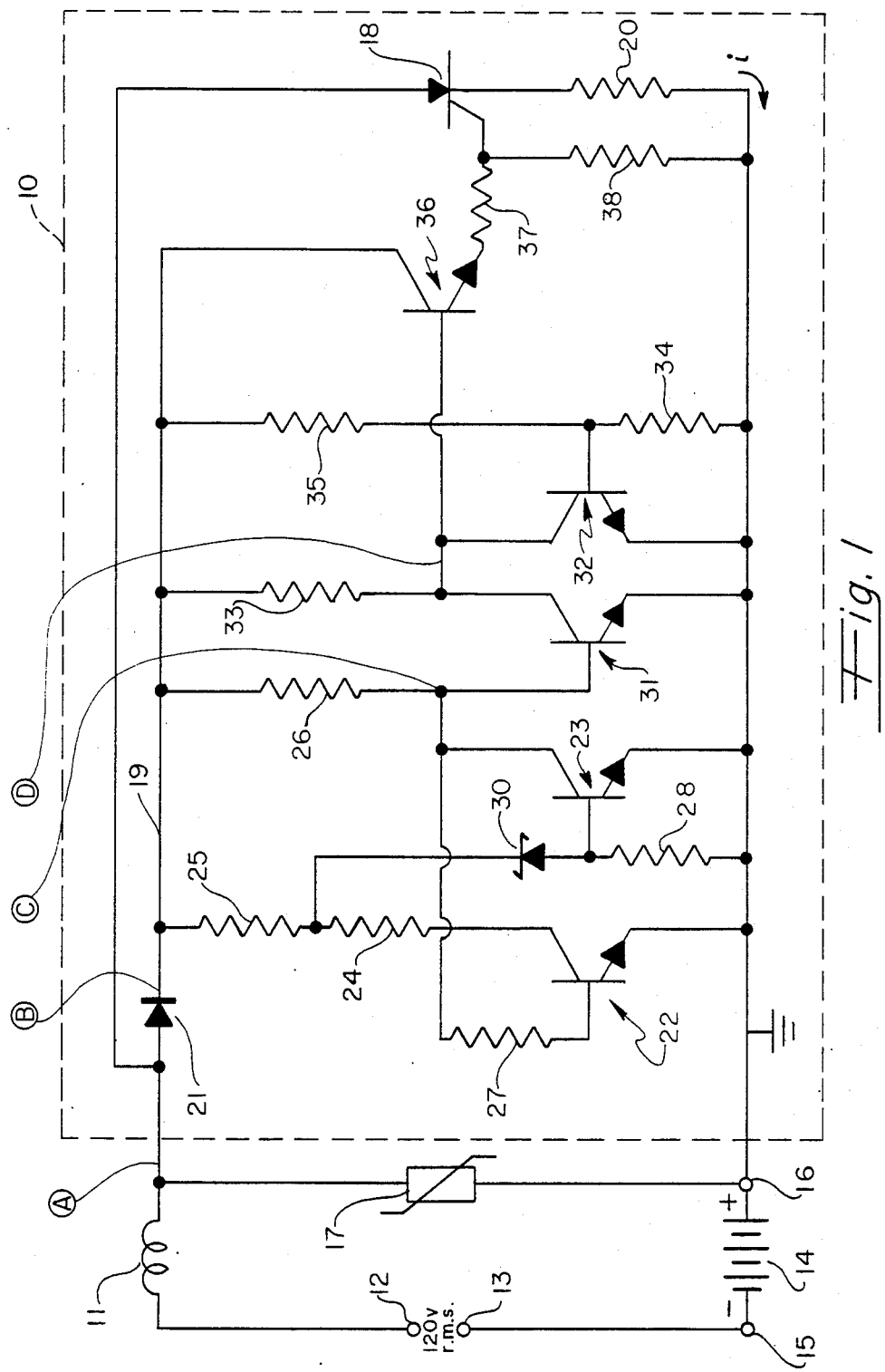
FIG. 1 is a schematic diagram of a battery charging and/or forming circuit incorporating a current pulse producing, current regulating circuit in accordance with a first exemplary embodiment of the invention.

As illustrated in FIG. 1, a first exemplary embodiment of a current regulating circuit in accordance with the present invention is designated generally by the numeral 10. The current regulating circuit 10 is connected in series, via a transient limiting inductance 11, to a first supply terminal 12 of a conventional 120 volts r.m.s. A.C. power supply, a second supply terminal 13 of the supply being conductively connected to the negative pole of a battery 14, which is to be charged or formed, via a terminal 15. The positive pole of the battery 14 is connected to a terminal 16. As illustrated, the terminal 16 is at circuit ground reference of the current regulating circuit 10. A varistor 17 is conductively connected between the circuit ground reference, illustrated as the terminal 16, and that end of the inductor 11 which is not connected to the A.C. supply terminal 12. The varistor 17 provides a degree of protection for the current regulating circuit 10 against line surges and line transients.

The current regulating circuit 10 includes a silicon-controlled-rectifier (SCR) 18 which as its anode conductively connected to a circuit point defined by the connection between the inductor 11 and the varistor 17. The cathode of the SCR 18, as illustrated, is connected to the ground reference of the current regulating circuit 10, via a resistor 20. It is to be understood that the resistor 20 in the circuit of FIG. 1 is optional; the cathode of the SCR 18 could be directly connected to the ground reference.

Operating voltages and currents for the control circuit portions of the current regulating circuit 10 are provided by a rectifying diode 21 having its anode coupled to the A.C. supply terminal 12, via the inductor 11, and its cathode conductively connected to a bus 19. The rectifying diode 21 supplies positive going, unfiltered, half wave rectified operation voltage to the current regulating circuit 10, via the bus 19. The control portion of the current regulating circuit 10 includes a pair of NPN transistors 22 and 23 having respective emitters directly conductively connected to the reference circuit ground. The collector of the transistor 22 is connected to the cathode of the rectifying diode 21 via series connected resistors 24 and 25. The collector of the transistor 23 is connected, via a resistor 26, to the bus 19 and, thus, to the cathode of the diode 21. The collector of the transistor 23 is also connected to the base of the transistor 22 via a resistor 27, providing a varying potential and current thereto. The base of the transistor 23 is connected, via a resistor 28, to the circuit reference ground and via, a Zener diode 30, to a circuit point between the resistors 24 and 25, the cathode of the Zener diode being connected to this circuit point. In operation the circuit constituted by the transistors 22 and 23 and the associated above-mentioned circuit components functions to provide an output from the collector of the transistor 23, the circuit having a distinct hysteresis characteristic, in the nature of a Schmitt trigger circuit.

The control circuit portion of the current regulating circuit 10 includes an active, OR function circuit composed of two NPN transistor 31 and 32 having their respective emitters directly connected to the reference circuit ground. The respective collectors of the NPN transistors 31 and 32 are connected to the bus 19, and thus to the cathode of the rectifying diode 21, via a resistor 33. The base of the transistor 32 is connected, via a resistor 34, to the circuit reference ground and, via a resistor 35, to the bus 19.

The collectors of the transistors 31 and 32 are conductively connected to the base of a NPN transistor 36 having its collector conductively connected to the bus 19 and thus to the cathode of the rectifying diode 21. The emitter of the transistor 36 is connected to the control electrode of the SCR 18 via a resistor 37, the control electrode also being connected to the circuit reference ground via a resistor 38.

In a specific, realized embodiment of the current regulating, current pulse producing circuit 10 used in the battery forming and/or charging circuit shown in FIG. 1 and suitable for forming and/or charging relatively small capacity batteries, charging current pulses of about 8.0 amperes peak are produced, the average current being about 0.12 amperes. In a discrete component embodiment, the resistor sizes are as follows:

Resistor 20=0.07 Ω

Resistor 24=4.7 KΩ
Resistor 25=100 KΩ
Resistor 26=50 KΩ
Resistor 27=4.7 KΩ
Resistor 28=10 KΩ
Resistor 33=50 KΩ
Resistor 34=3.17 KΩ
Resistor 35=100 KΩ
Resistor 37=56 Ω
Resistor 37=56 Ω
Resistor 38=1 KΩ.

The inductor 11 used is a 24 μh inductor. Virtually any commercially available NPN transistors could be used in the circuit of FIG. 1, provided the current carrying capacities were appropriately selected. The Zener diode 30 used in the realized embodiment illustrated in FIG. 1 has a breakdown voltage of 4.7 volts. The control circuit 10 illustrated in FIG. 1 could be constructed as an integrated circuit or, alternatively, as a circuit on a printed circuit board. Of course, this circuit could also be constructed entirely from discrete components.

Turning again to FIG. 1, with reference to the waveforms and diagrams shown in FIGS. 2A-2H, a brief discussion of the operation of the circuit of FIG. 1 follows.

The operation of the circuit of FIG. 1 can be readily understood with reference to FIG. 1 and to the waveforms and diagrams illustrated in FIGS. 2A-2H.

The A.C. power applied to the power input terminals 12 and 13 is 120 volts, r.m.s., 60 Hz. At point A in the circuit of FIG. 1, a sinusodial voltage waveform A, illustrated in FIG. 2A appears. A portion of the A.C. power supplied to the terminals 12 and 13 is rectified by the diode 21 and appears on the bus 19. The rectified voltage is not filtered or smoothed; thus, a half wave rectified voltage, illustrated as waveform B shown in FIG. 2B, appears on the bus 19 designated as the circuit point B. The waveform B shows that the rectified half wave is not filtered, that is, is not smoothed.

Initially, no current flows in the current regulating circuit 10 as the rectified half wave voltage starts a sinusodially upward increase towards its peak of about 170 volts. As the voltage level starts upwardly, however, the transistors 22 and 31 turn on, the conductive condition of the transistor 31 becomes conductive, as diagramatically illustrated in FIG. 2F. The conduction of the transistor 31 results in the voltage at the base of the control transistor 36, the base of which is conductively connected to the collector of the transistor 31, being held as the sinusodial half wave input increases at levels insufficient to allow the transistor 36 to become conductive thereby preventing triggering of the SCR 18. Consequently, no charging pulse current is yet supplied to the battery 14, albeit a low level current from the transistors 31 and 22 flows through the battery. Conduction of the transistor 22 holds the transistor 23 off by maintaining the voltage at the point between the resistors 24 and 25 at levels insufficient to cause the diode 30 to conduct.

Figure 2:
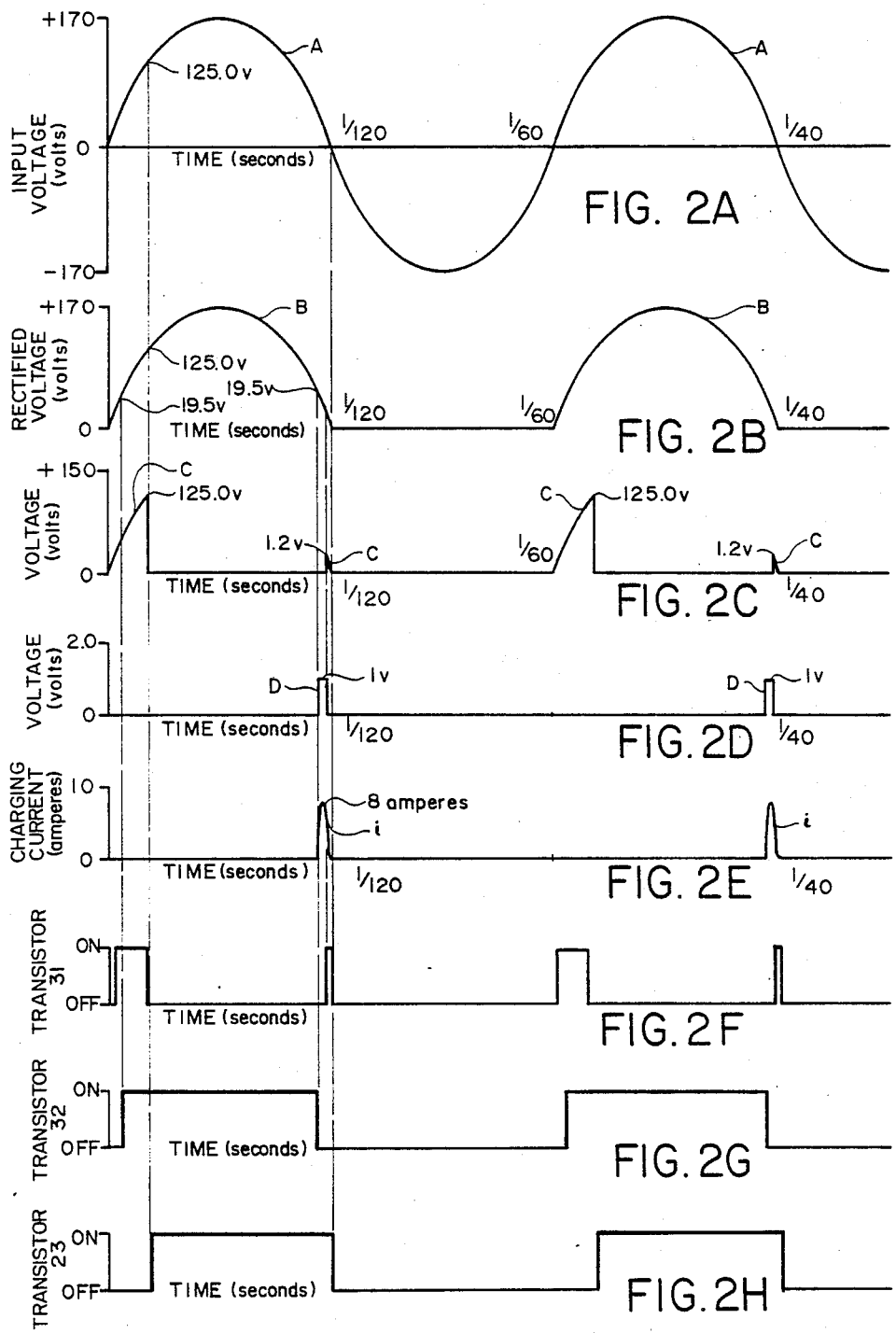
FIGS. 2A–2E are waveforms of voltages and current as a function of time at a number of points in the circuit of FIG. 1 useful in understanding the operation thereof.
FIGS. 2F–2H are diagrams indicating the conductive states of certain transistors in the circuit of FIG. 1 as a function of time and which, when taken with FIGS. 2A–2E, make the operation thereof readily understandable.

When the voltage on the bus 19 and reaches on its upswing about 19.5 volts, the transistor 32 is turned on, as illustrated in FIG. 2G, further preventing conduction of the control transistor 36 and its triggering of the SCR 18. As the voltage on the bus 19 further increases and reaches about 125 volts, the transistor 23 turns on, as indicated in FIG. 2H. The conducting of the transistor 23, turns off the transistors 22 and 31; nevertheless, the control transistor 36 remains off, because its base is connected to the collector of the transistor 32 which is still conducting (see FIG. 2G.) The SCR 18 is not yet fired and remains nonconductive. As the instant voltage on the bus 19 decreases and approaches the end of a half cycle, the transistor 32 is turned off when the bus potential reaches about 19.5 volts, as indicated in FIG. 2G.

The control transistor 36 becomes conductive, its emitter current flowing through the resistors 37 and 38. The SCR 18 fires because the voltage on its control electrode increases as a result of the transistor 36 conducting, this electrode being connected between the resistors 38 and 37. As a result, the narrow current pulse i, having a peak of about 8 amperes, shown in FIG. 2E is produced, the SCR 18 turning off as the half wave voltage appearing on the bus 19 approaches close to zero, as diagramatically illustrated in FIG. 2E.

The above-described turning on and off of the SCR 18 occurs time-and-time again, each time producing a charging current pulse to the battery 14 so as to form, charge or recharge the battery.

The cycle of operations is allowed to continue each time a half wave input voltage appears on the bus 19, the circuit being turned off by a user when the battery 14 has been charged to the desired level.

Figure 3:
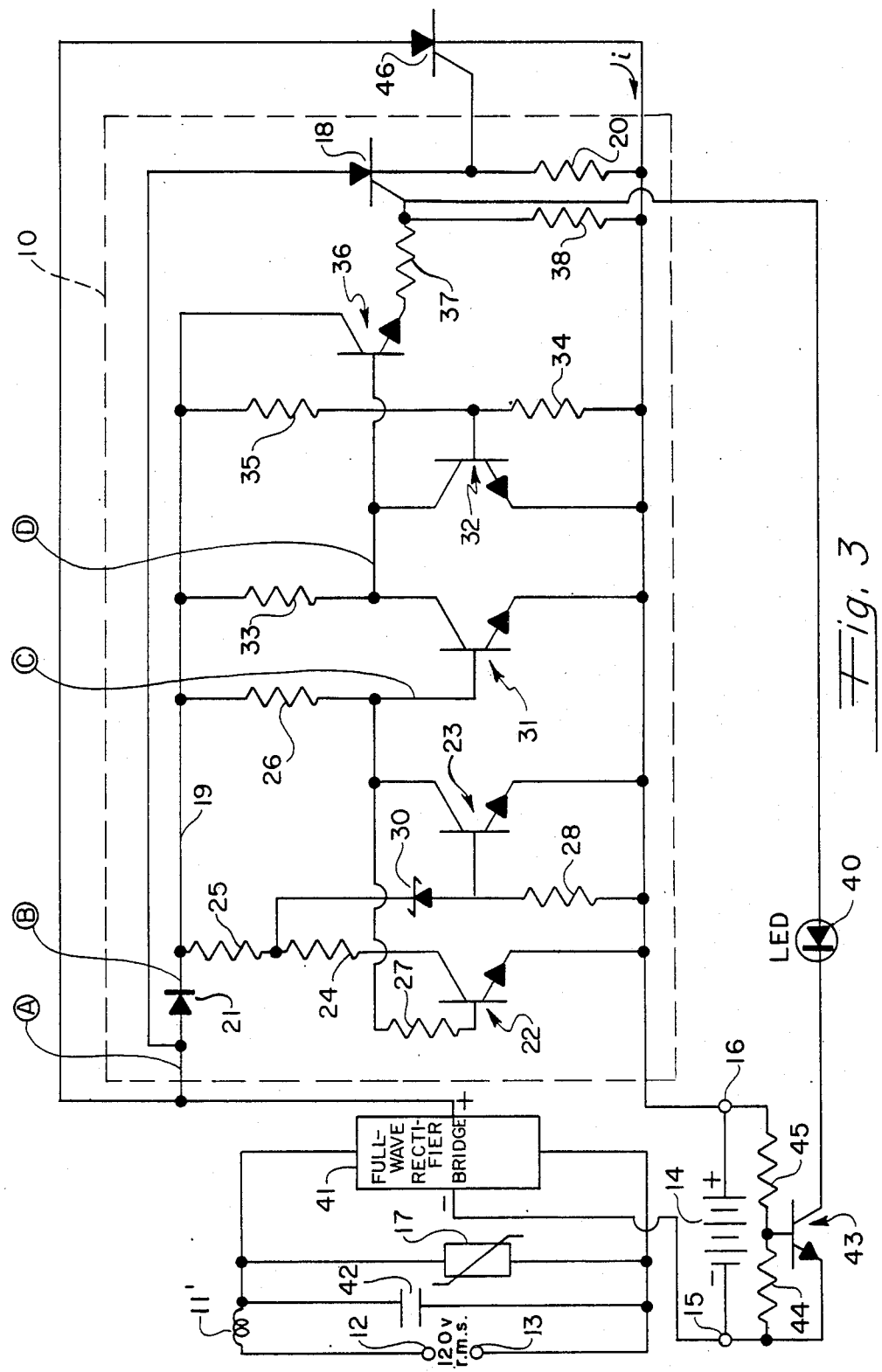
FIG. 3 is a schematic diagram of a battery charging and/or forming circuit incorporating a current pulse producing, current regulating circuit in accordance with a second exemplary embodiment of the present invention.

Referring to FIG. 3, a second exemplary embodiment of a current pulse producing, current regulating circuit similar to the circuit of FIG. 1, but having a higher current carrying capacity is illustrated. The current regulating circuit 10 is associated with a light emitting diode (LED) 40 to which further reference is made below. Corresponding reference numerals used in FIGS. 1 and 3 refer to like circuit components which perform like functions. The current regulator 10 of FIG. 3 corresponds exactly to that of FIG. 1 except for its external connections. The resistor 20, which need not have any finite value in the circuit of FIG. 1 as noted above, must be present in the circuit of FIG. 3 as illustrated. The cathode of the silicon-controlled-rectifier (SCR) 18 is conductively connected to the control electrode of an additional SCR 46 which has its cathode conductively connected to the circuit reference ground and thus to the terminal 16 to which the positive pole of the battery 14 which is to be charged or formed. The charging current pulses flow through the SCR 46 under the control of the SCR 18 which is arranged to fire the SCR 46.

Unlike the circuit of FIG. 1, the basic current regulator 10 of FIG. 3 is arranged to be supplied with power from the supply terminals 12 and 13 of the A.C. 120 volts r.m.s. source via a full wave rectifier bridge 41 having its positive output terminal conductively connected to the anode of the rectifying diode 21, which could be replaced with a conductive connection. The positive output terminal of the full wave rectifier bridge 41 is also conductively connected to the anode of the charging current pulse carrying SCR 46. A capacitor 42 is desirably connected from the A.C. supply terminal 13 to that end of the inductor 11 which is not connected to the A.C. supply terminal 12 and thus in parallel with the varistor 17 and the A.C. input connections to the rectifier bridge 41. The capacitor 42 serves to reduce affects of line transients, thereby protecting the current regulating circuit 10 and the SCR 46.

The terminal 15, to which the negative pole of the battery 14 is connected, is itself conductively connected to the negative output terminal of the rectifier bridge 41. A resistor 44 and a resistor 45 are connected in series across the terminals 15 and 16, and thus across the battery 14. These resistors 44 and 45 constitute a high resistance voltage divider, some current from the battery 14 flowing therein, the voltage at the circuit point between the resistors 44 and 45 having a potential corresponding to a fraction of the instant battery voltage.

A control NPN transistor 43 is provided, its base being connected to the circuit point between the resistors 44 and 45. The emitter and collector of the transistor 43 are connected respectively to the negative terminal of the full wave rectifier bridge 41 and to the control electrode of the SCR 18, this latter connection being effected via the LED 40.

In a specific, realized embodiment of the current regulating circuit 10 used in the battery forming and/or charging circuit of FIG. 3 and suitable for forming and/or charging relatively large capacity batteries and generally achieving faster charging, the resistances values for the resistors of the current regulating circuit 10 are the same for resistors with reference numerals corresponding to those in the circuit of FIG. 1. The average current achieved is about 1.5 amperes and the peak current correspondingly greater, about 37.5 amperes. The inductive value of the inductor 11 in the realized exemplary embodiment of the circuit of FIG. 3 is 40 $\mu$h. The resistive values of resistors 44 and 45 are not critical; of course, these resistors should be, when taken together, of high value and thus not place a significant drain on the battery 14.

The operation of the circuit of FIG. 3 can be readily understood with reference to FIG. 3 and to the waveforms and diagrams illustrated in FIGS. 4A–4H.

The A.C. power applied to the power input terminals 12 and 13 is 120 volts, r.m.s., 60 Hz. At point A in the circuit of FIG. 3, a rectified voltage waveform A, illustrated in FIG. 4A, appears. The A.C. power supplied to the terminals 12 and 13 is rectified by the full wave rectifier bridge 41 and is applied to the anode of the SCR 46 and to the anode of the diode 21. A portion of each half wave, unfiltered input energy is passed by the diode 21, its output appearing on the bus 19. The rectified voltage passed by the diode 21 is not filtered or smoothed; thus, two half wave, positive going voltages, illustrated as waveform B shown in FIG. 4B, appears on the bus 19 designated as the circuit point B. The waveform B shows that the rectified full wave input applied to circuit 10 is not filtered, that is, is not smoothed.

Initially, no current flows in the current regulating circuit 10 as the rectified input voltage starts a sinusodially upward increase towards its peak of about 170 volts. As the voltages level starts upwardly, however, the transistors 22 and 31 become conductive, the conductive condition of the transistor being diagramatically illustrated in FIG. 4F. The conduction of the transistor 31 results in the voltage at the base of the transistor 36, the base of which is conductively connected to the collector of the transistor 31, being held as the rectified sinusodial input increases, at levels insufficient to cause the transistor 36 to become conductive, preventing it from firing the SCR 18. Consequently, no charging pulse current is yet supplied to the battery 14, albeit a low level from the transistors 31 and 22 current flows through the battery. Conduction of the transistor 22 holds the transistor 23 off by maintaining the voltage at the point between the resistors 24 and 25 at levels insufficient to cause the diode 30 to conduct.

Figure 4A:
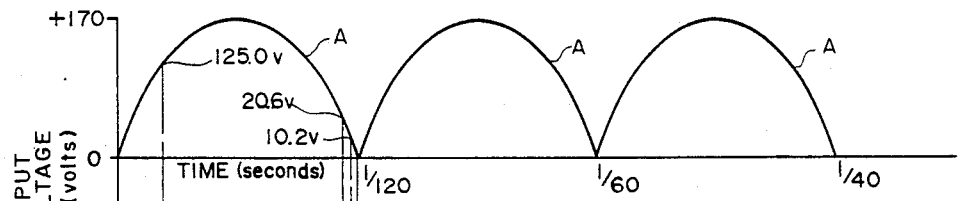
FIGS. 4A–4E are waveforms of voltages and current as a function of time at a number of points in the circuit of FIG. 3 useful in understanding the operation thereof.
Figure 4B:
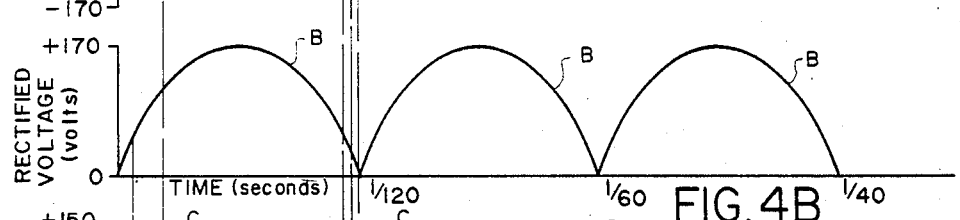
Figure 4C:
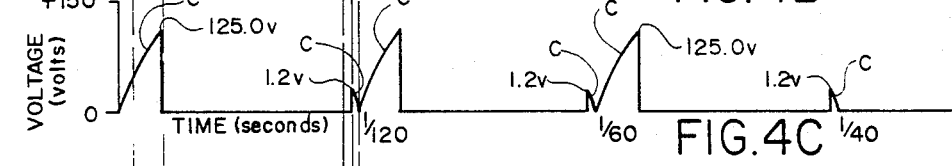
Figure 4D:
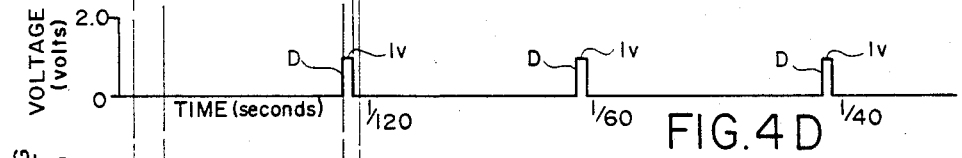
Figure 4E:
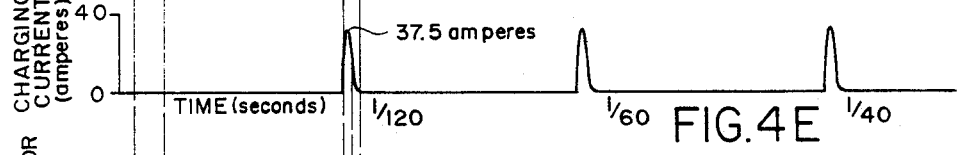
Figure 4F:
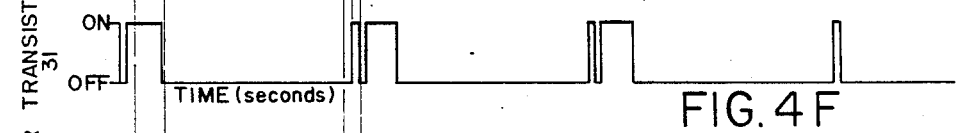
FIGS. 4F–4H are diagrams indicating the conductive states of certain transistors in the circuit of FIG. 3 as a function of time and which, when taken with FIGS. 4A–4E, make the operation thereof easily understandable.
Figure 4G:
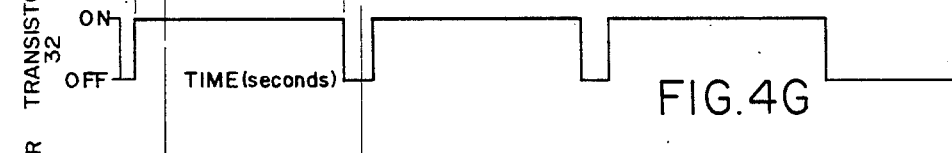
Figure 4H:
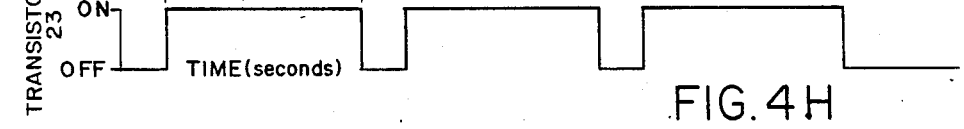

When the voltage on the bus 19 reaches on its upswing about 19.5 volts, the transistor 32 is turned on, as illustrated in FIG. 2G, further preventing conduction of the control transistor 36 and its triggering of the SCR 18 and the SCR 46. A the voltage or the bus 19 further increases and reaches about 125 volts, the transistor 23 turns on, as indicated in FIG. 4H. The conduction of the transistor 23 results in the turning off of the transistors 22 and 31; nevertheless, the control transistor 36 remains off, because its base is connected to the collector of the transistor 32, which is still conducting (see FIG. 4G). The SCR 18 is not yet fired and remains nonconductive. As the instant voltage supplied by the bus 19 decreases and approaches the end of a half cycle, the transistor 32 is turned off when the potential reaches about 19.5 volts, as indicated in FIG. 4G. The control transistor 36 becomes conductive, its emitter current flowing through the resistors 37 and 38. The SCR 18 fires because the voltage on its control electrode increases, as a result of the control transistor 36 conducting this electrode being connected between the resistors 38 and 37. As a result, the SCR 18 conducts, resulting in a voltage drop across the resistor 20. Consequently, the SCR 46 is fired, its control electrode being connected to the cathode of the SCR 18 and the ungrounded end of the resistor 20. Conduction of the SCR 46 produces a narrow current pulse i, having a peak of about 37.5 amperes, shown in FIG. 4E. The SCR 18 and thus the SCR 46 are turned off as the voltage appearing on the bus 19 approaches close to zero, as illustrated in FIG. 4E. The transistor 23 also becomes nonconductive at substantially the same time the SCR 18 and the SCR 46 become nonconductive, as diagramatically illustrated in FIG. 4H.

The above-described turning on and off of the SCR 18 and the SCR 46 occur time-and-time again, each time producing a charging current pulse to the battery 14 so as to form, charge or recharge the battery. The cycle of operation is allowed to continue until the battery becomes fully charged and the circuit is turned off by a user.

Figure 5:
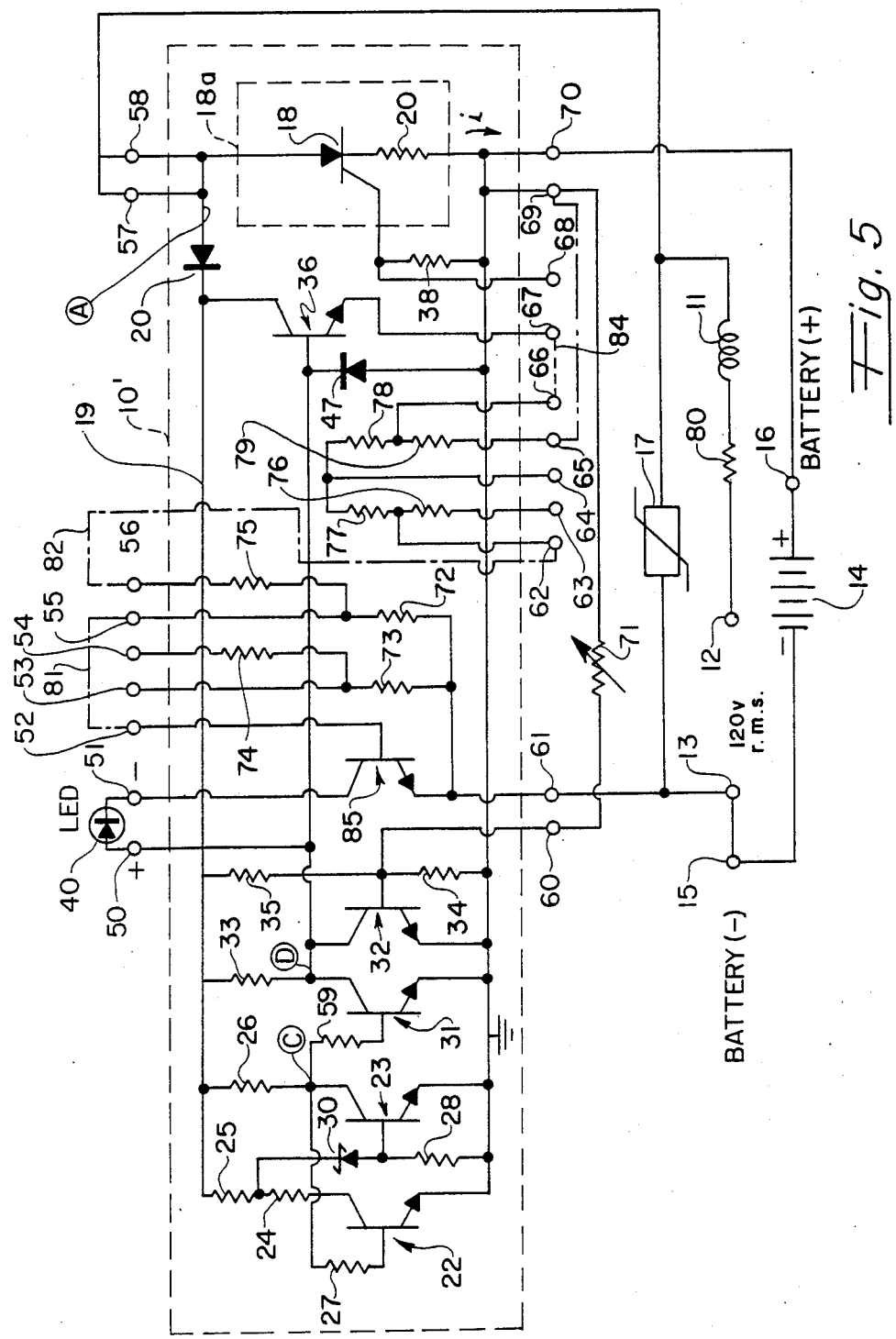
FIG. 5 is a schematic diagram of a battery charging circuit incorporating a current pulse producing, current regulating circuit in accordance with a third exemplary embodiment of the present invention, the circuit being adapted to charge and/or form batteries of widely different capacities and terminal voltages.

A variant of the current regulating circuit of FIG. 1 is illustrated in FIG. 5 in combination with a battery 14 to be charged or formed, corresponding circuit components being identified using like reference numerals. The current regulating circuit 10' as illustrated in FIG. 5 differs from the current regulating circuit 10 of FIG. 1 in order to provide a current regulating circuit which can be adjusted, or for that matter initially constructed, so that it can serve to supply current pulses to charge or form batteries of differing capacities and terminal voltages. For example, the current regulating circuit 10' as illustrated can serve to charge batteries having 1 to 16 nickel-cadmium (NICAD) cells or 1 to 16 lead-acid cells. The circuit 10' similarly to the circuit illustrated in FIG. 3 is provided with automatic cut-off.

As shown, the current regulating circuit 10' of FIG. 5 is provided with twenty terminals 50–58 and 60–70. When the current regulating circuit 10' is realized on a printed circuit board, the twenty terminals 50–58 and 60–70 can be points on the board or pins extending therefrom. When it is realized as an integrated circuit, the terminals could be constituted as pins extending from the housing or potting within which the integrated circuit is fixed.

The charging current pulse carrying SCR 18 in FIG. 5 is diagramatically shown within block 18a, this simply for the purpose of pointing out that the SCR 18 could be on a separate circuit board or a separate chip in embodiments in which the circuit 10' is realized as an integrated circuit. Resistor 20 could, as in the circuit of FIG. 1, be replaced by a conductive connection which would provide a somewhat greater current carrying capacity. When present, the resister 20 serves to limit peaks of the current pulses supplied to the battery 14.

A LED 40′ is connected between the terminals 50 and 51, the terminal 51, which is connected to the cathode of the LED 40′ is connected to the collector of a NPN transistor 85 which has its emitter conductively connected to the terminal 61, which is connected to the terminal 13 of the 120 volts r.m.s., A.C. power source, as is the negative terminal 15 to which the negative pole of the battery 14 is connected. One end of the varistor 17 is also connected to the terminal 61. The base of the transistor 85 is connected to the terminal 52. The emitter of the transistor 85 is respectively connected to terminals 53 and 55 via respective resistors 73 and 72. The terminal 54 is connected, via a resistor 74, to that end of the resistor 73 which is not connected to the emitter of the transistor 85. The terminal 56 is connected, via a resistor 75, to that end of the resistor 72 which is not connected to the emitter of the transistor 85.

It is to be noted that the circuit of FIG. 5, unlike the circuit of FIG. 1, does not have a resistor in series with the emitter of the transistor 36 and the control electrode of the SCR 18. Instead, this circuit is open between the terminals 67 and 68. A resistor 38′, in a realized embodiment, extends between the control electrode of the SCR 18 and the circuit reference ground, this resistor being a 50 ohms resistor.

The base of the transistor 32 is connected to circuit reference ground via the terminal 60 and a series resistance 71, illustrated as a variable resistance. The particular ohmic size of the resistance 71 determines the turn-on point of the SCR 18. As a practical matter, once one determines the desired width of the current pulses to be passed by the SCR 18, a fixed resistor can be selected and placed in circuit as the resistance 71. Of course, in those instances when it is desired to adjust the pulse width in a circuit in the field, a manually adjustable variable resistance could be used for the resistance 71.

As is apparent, the transistor 85 and the LED 40′ serve the same purpose as the transistor 43 and the LED 40 as used in the circuit of FIG. 3, albeit somewhat different connections are involved. The base of the transistor 85 is conductively connected, as noted above, to the terminal 52 which may be connected via a conductive connection indicated by the dash-dot line 81 to the terminal 55 which is connected to one end of the resistor 72, which has its other end conductively connected to the emitter of the transistor 85, thereby placing the resistor 72 between the base and emitter of the transistor 85. A further conductive connection, illustrated by the dash-dot line 82, may be made between the terminal 56 and terminal 62. An additional conductive connection, indicated by the dash-dot line 83 may be made between the terminal 65 and terminal 69. Terminals 67 and 68 maybe are conductively connected together as indicated by the dash-dot line 84. In some cases, a resistor (not illustrated) could be connected between the terminals 67 and 68 providing a circuit connection and function such as that provided by the resistor 38 in the circuit of FIG. 1.

The circuit connections provided by the conductive connections 81, 82, and 84 arrange the circuit so that it is effective for charging a 15 cell lead-acid battery. Other different conductive connections would be provided among the terminals 52–70 in the event one wished to charge or form lead-acid batteries having a different number of cells. The respective terminal connections, which would be made for charging lead-acid batteries of from one to sixteen cells, are set out below in Table I.

TABLE I

| LEAD-ACID BATTERIES | |
|---|---|
| Number of Cells | Terminal Connections |
| 1 | 52 to 55, 56 to 70 |
| 2 | 52 to 55, 56 to 62, 63 to 70 |
| 3 | 52 to 55, 56 to 62, 64 to 70 |
| 4 | 52 to 55, 56 to 63, 64 to 70 |
| 5 | 52 to 55, 56 to 64, 66 to 70 |
| 6 | 52 to 55, 56 to 63, 62 to 64, 66 to 70 |
| 7 | 52 to 55, 56 to 62, 66 to 70 |
| 8 | 52 to 55, 56 to 63, 66 to 70 |
| 9 | 52 to 55, 56 to 65, 66 to 70 |
| 10 | 52 to 55, 56 to 62, 63 to 65, 66 to 70 |
| 11 | 52 to 55, 56 to 62, 64 to 66, 65 to 70 |
| 12 | 52 to 55, 56 to 63, 64 to 66, 65 to 70 |
| 13 | 52 to 55, 56 to 64, 65 to 70 |
| 14 | 52 to 55, 56 to 62, 63 to 64, 65 to 70 |
| 15 | 52 to 55, 56 to 62, 65 to 70 |
| 16 | 52 to 55, 56 to 63, 65 to 70. |

The ohmic values and inductive value for the resistors and inductance used in the circuit of FIG. 5 correspond to the values of the resistors and inductance having identical reference numerals in the circuit of FIG. 1, except that resistor 38 in a realized embodiment of FIG. 5 was 50 Ω as indicated above, whereas the resistor 38 in the circuit of FIG. 1 as realized was 1 KΩ. The resistance of the variable or selected fixed resistance 71 can be chosen to fix accurately the desired width of the current pulses. For example, it may be infinite thereby in effect placing only resistor 34 between the base and emitter of transistor 32, the resistance 71 being in parallel with the resistor 34. As the selected value of the resistance 71 is decreased, the turn-on point for the transistor 32 is correspondingly delayed. The ohmic value of the resistor 80 is not critical; it may be from zero to a few ohms.

In the realized embodiment of the circuit shown in FIG. 5 for the purpose of charging and/or forming lead-acid batteries, resistors 72–79 had ohmic values as set out below:

Resistor 72: 428 Ω
Resistor 73: 750 Ω
Resistor 74: 962 Ω
Resistor 75: 1,284 Ω
Resistor 76: 1,712 Ω
Resistor 77: 3,425 Ω
Resistor 78: 6,850 Ω
Resistor 79: 13,700 Ω.

The circuit of FIG. 5, in a further realized embodiment, for the purpose of charging and/or forming nickel-cadmium (NICAD) batteries of different capacities, in terms of number of series cells, involves somewhat different conductive connections among the terminals 52–70. These connections are set out below in Table II.

TABLE II

| NICAD BATTERIES | |
|---|---|
| Number of Cells | Terminal Connections |
| 1 | 52 to 53, 54 to 70 |
| 2 | 52 to 53, 54 to 62, 63 to 70 |
| 3 | 52 to 53, 54 to 62, 64 to 70 |
| 4 | 52 to 53, 54 to 63, 64 to 70 |
| 5 | 52 to 53, 54 to 64, 66 to 70 |

TABLE II-continued
NICAD BATTERIES

| Number of Cells | Terminal Connections |
| --- | --- |
| 6 | 52 to 53, 54 to 63, 62 to 64, 66 to 70 |
| 7 | 52 to 53, 54 to 62, 66 to 70 |
| 8 | 52 to 53, 54 to 63, 66 to 70 |
| 9 | 52 to 53, 54 to 65, 66 to 70 |
| 10 | 52 to 53, 54 to 62, 63 to 65, 66 to 70 |
| 11 | 52 to 53, 54 to 62, 64 to 66, 65 to 70 |
| 12 | 52 to 53, 54 to 63, 64 to 66, 65 to 70 |
| 13 | 52 to 53, 54 to 64, 65 to 70 |
| 14 | 52 to 53, 54 to 62, 63 to 64, 65 to 70 |
| 15 | 52 to 53, 54 to 62, 65 to 70 |
| 16 | 52 to 53, 54 to 63, 65 to 70. |

The selected size for the various resistors and other components used in the realized embodiment of FIG. 5 for charging nickel-cadmium batteries corresponds exactly to the sizes of the resistors and components used in the realized lead-acid embodiment. It is to be understood that the circuit of FIG. 5 could, in respective variants, be modified so as to apply to either lead-acid or nickel-cadmium or other types of batteries and/or a lesser range of cells of either type battery using Tables I and II as a guide. The number of required terminals and resistive combinations which would be provided thus could be changed to correspond to the desired flexibility desired in given case.

The circuit of FIG. 5 functions like the circuit of FIG. 1 so far as the transistors 22, 23, 31, 32 and 36, and the SCR 18 are concerned. The operation need not be repeated here.

The circuit of FIG. 5, unlike the circuit of FIG. 1, is provided with a turn-off function responsive to battery voltage. Briefly, the terminal voltage of the battery 14 being formed or charged is monitored by the transistor 85, which remains off so long as the voltage which appears between its emitter and base is below a given magnitude. The voltage applied to the base of the transistor 85, via the selected connections among the terminals 52-70, is a fraction of the terminal voltage of the battery 14, the fraction value of which depends on the ohmic sizes of those of the selected resistors 72-79 which are in circuit, these resistors functioning as a voltage divider. When the voltage applied to the base of the transistor 85 is below a given magnitude, the transistor 85 remains off, the LED 40' does not emit light, and charging current pulses are supplied to the battery 14. When the voltage applied to the base of the transistor 85 reaches a given magnitude indicative of the battery 14 having become fully charged, the transistor 85 becomes conductive. The LED 40', through which the current from the transistor 85 flows, emits a light indicative of the battery becoming fully charged. The LED 40' blinks on-and-off because the whole circuit is turned on-and-off, it being powered from the unfiltered half wave rectified A.C. input. The base of the control transistor 36, which is connected to the anode of the conducting LED 40', is coupled when the transistor 85 conducts via the conducting LED 40' and the conducting transistor 85 to the terminal 15 to which the negative pole of the battery 14, which has been fully charged or formed. Consequently, the transistor 36 is turned off and remains off until the terminal voltage of the battery 14 again falls. The SCR 18 does not receive any firing current to its control electrode from the transistor 36 so long as the transistor is off, and consequently does not supply charging current pulses to the battery 14 until the transistor 36 again is allowed to become conductive when the transistor 85 is again turned off as a result of the terminal voltage of the battery falling.

FIGS. 6A-6E are simplified schematic illustrations which demonstrate the possible modular nature of the current regulating circuit 10 of FIGS. 1 and 3.

The current regulating circuit 10, the major component of the circuits illustrated in FIGS. 1 and 3, can be made as an integrated circuit and, alternatively, can be constructed on a printed circuit board. In either case, the circuit 10 can be readily used with other circuit components as a modular circuit component. The simplified schematic circuit diagrams illustrated in FIGS. 6A-6E indicate use of the current regulating circuit 10 in a modular fashion.

Figure 6A:
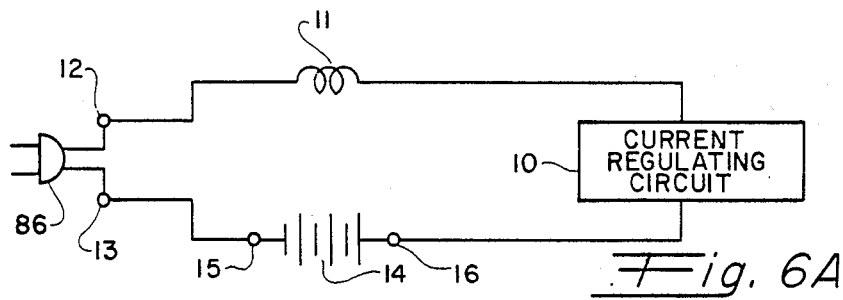
FIGS. 6A–6E are respective, simplified schematic, partially block, diagrams illustrating how the basic current regulating circuit of FIG. 1 can be utilized as a component of the circuit of FIG. 3 and in other circuits as well.

In FIG. 6A, which corresponds to FIG. 1, the current regulating circuit 10 is connected via the inductor 11 to A.C. power input terminal 12, an A.C. wall plug 86 being shown diagramatically. The terminal 15, to which the negative pole of the battery 14 is connected, is conductively connected to the A.C. power input terminal 13. The positive pole of the battery 14 is connected to the current regulating circuit 10 via the terminal 16. The circuit of FIG. 6A is especially useful as a low current trickle charger.

Figure 6B:
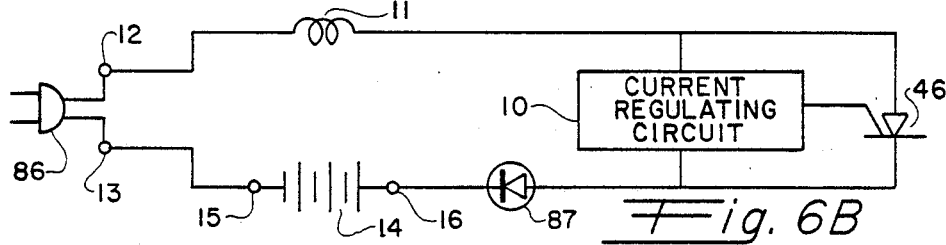

As illustrated in FIG. 6B, by merely adding the SCR 46 having its anode conductively coupled to the A.C. input terminal 12, via the inductor 11, and its cathode connected to the terminal 16 to which the positive pole of the battery 14 to be charged or formed is connected, a continuously acting charging circuit may be realized. A LED engergizing circuit 87 is connected in series with the battery 14. In this case the control electrode of SCR 46 would be conductively connected to the anode of the SCR 18 (FIG. 1) forming part of the current regulating circuit 10. This circuit is especially useful in charging batteries during a conventional slow charging time period, for example in about three hours.

Figure 6C:
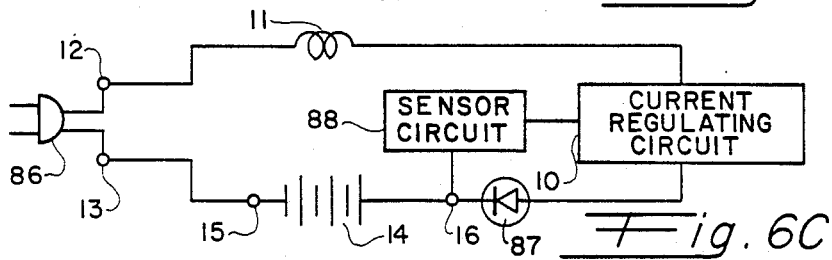

The circuit of FIG. 6C represents a different modification add-on to the circuit of FIG. 6A, in which a LED energizing circuit 87 is added in series between the terminal 16, to which the positive pole of the battery 14 is connected, and the current regulating circuit 10, the LED energizing circuit 87 providing an indication when current pulses are being supplied to the battery 14 being charged or formed. Additionally, a battery terminal voltage sensor 88 (much like the monitoring circuit constituted by transistor 43 and resistors 44 and 45 of FIG. 3) is provided, its output providing a turn-off voltage to the current regulating circuit 10 (much like the circuit of FIG. 3). The circuit of FIG. 6C is especially useful as a voltage controlled trickle charger for lead-acid batteries, as well as other types of batteries, providing a cutoff feature.

Figure 6D:
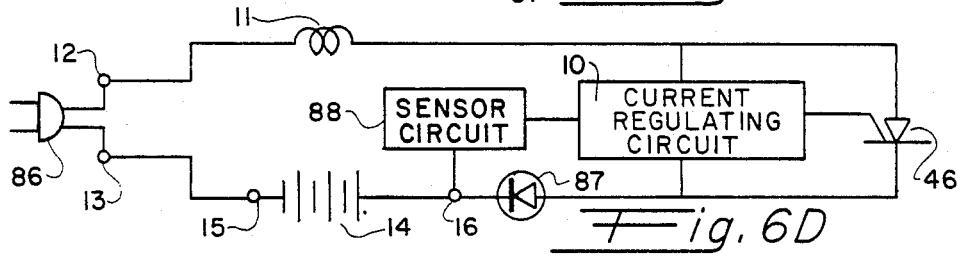

As shown in FIG. 6D, a further circuit is provided in which the current regulating circuit 10 is arranged in circuit with an external SCR 46' (as is the circuit of FIG. 6B), a voltage sensor 88 (as is the circuit of FIG. 6C), and a LED energizing circuit 87 (as is the circuit of FIG. 6C). This particular circuit is considered to be a good configuration for fast chargers, for example, chargers which effect charging of a battery rapidly, for example within a period of about one hour.

Figure 6E:
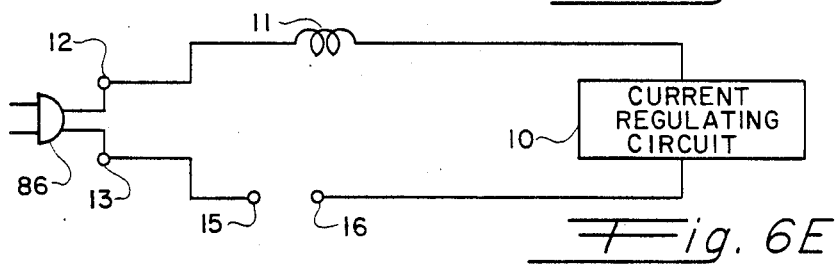

As illustrated in FIG. 6E, the battery 14 shown in FIG. 6A has been removed, providing the possibility of connecting smoothing circuits thereto so as to use the current regulating circuit 10 as a component of an off-line power supply. Of course, the circuits of FIGS.

6B–6D also could be used as components of off-line power supplies by replacing the battery 14, in each case, with a smoothing circuit.

Figure 7:
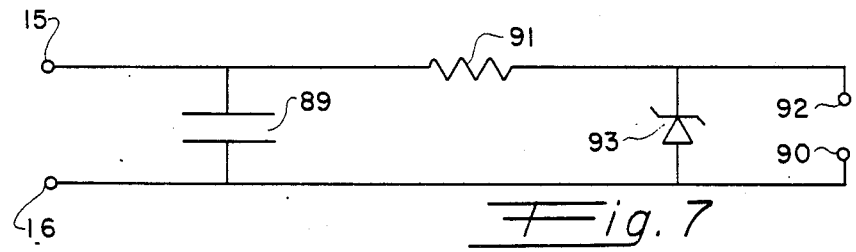
FIG. 7 is an example of a smoothing circuit which can be connected to and receive the current pulse outputs in place of the batteries in the event one wishes to use any of the current regulating circuits of FIGS. 1, 3, and 5 in conjunction therewith, and thus function in each case, as an off-line power supply.

To use any of the circuits of FIGS. 1, 3, 5, and 6A–6D as a component of an off-line power supply, the battery 14 would be removed and a smoothing circuit connected across the terminals 15 and 16 as shown, for example, in FIG. 7. As shown in FIG. 7, a relatively large, preferably electrolytic capacitor 89 is connected across the terminals 15 and 16, so as to accumulate charge from the current pulses supplied from either SCR 18 (FIGS. 1 or 5) or SCR 46 (FIG. 3). One plate of the capacitor 89 is directly connected to one output terminal 90 of the off line power supply, the other plate of the capacitor 89 being connected, via a resistor 91, to a second output terminal 92 of the power supply. A Zener diode 93 may be connected across the output terminals 90 and 92 thereby limiting the maximum output voltage. It is to be understood that any number of different smoothing (filtering) circuits could be connected across the terminals 15 and 16 to provide an off-line power supply. It is necessary that at least one of the circuit components be an energy storing element and be in the circuit to receive and store energy from the current pulses. The smoothing circuit may, especially when a voltage sensing control circuit is used as in the circuits of FIGS. 5, 6C and 6D, consist of a capacitor.

It is to be understood that the foregoing description and accompanying drawing figures relate to illustrative embodiments set out by way of example, not by way of limitation. Numerous other embodiments and variants are possible without departing from the spirit and scope of the invention, its scope being defined by the appended claims.

What is claimed is:

1. A battery charging or forming circuit comprising means across which a battery to be charged or formed is to be placed; means for providing an unfiltered, rectified input; control circuit means responsive solely to the unfiltered, rectified input for developing a control signal during a portion of decreasing swings of the unfiltered, rectified input; and means responsive to the control signal for passing current pulses to said means across which a battery is to be placed during a portion of the decreasing swings, wherein said control circuit means consists of circuit means responsive solely to the unfiltered, rectified input for providing an output controlling signal whenever the rectified input is above a first given level during upswings thereof and during downswings thereof until a second given level different from the first given level is reached and control means receiving the output controlling signal and responsive to absence of the output controlling signal for developing the control signal only at times when the unfiltered input reaches the second given level during downswings, and wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; an OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and fifth transistor each having a base, a collector and an emitter, said emitters of said fourth transistor and said fifth transistor being coupled to said circuit reference point; a second resistor, said collector of said fourth transistor being connected to said base of said third transistor, and via said second resistor, to said bus means; a third resistor and a fourth resistor, said third resistor being connected between said collector of said fourth transistor and said base of fifth transistor and said fourth resistor being connected between said bus means and each of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series between a circuit point defined by a connection between said fifth resistor and said sixth resistor and said circuit reference point.

2. The battery charging or forming circuit according to claim 1, wherein said means for providing an unfiltered, rectified input comprises a half wave rectifier.

3. The battery charging or forming circuit according to claim 1, wherein said means for providing an unfiltered rectifier input comprises a full wave rectifier.

4. The battery charging or forming circuit according to claim 1, wherein said means responsive to the control signal comprises at least one silicon-controlled-rectifier having its control electrode arranged to receive the control signal.

5. The battery charging or forming circuit according to claim 1, wherein said means responsive to the control signal includes a first silicon-controlled-rectifier having its control electrode arranged to receive the control signal and a second silicon-controlled-rectifier having its control electrode arranged to receive a firing input from said first silicon-controlled-rectifier.

6. The battery charging or forming circuit according to claim 1, further including means responsive to terminal voltage of a battery being charged or formed for developing a further control signal for preventing conduction of said means responsive to the first-mentioned control signal whenever the terminal voltage of the battery is at least substantially equal to a given value.

7. An off-line power suppply comprising smoothing circuit means; means for producing an unfiltered, rectified input; control circuit means responsive solely to the unfiltered, rectified input for developing a control signal during a portion of decreasing swings of the unfiltered, rectified input; and means responsive to the control signal for developing current pulses during a portion of the decreasing swings, said means for developing current pulses including means for coupling the current pulses to said smoothing circuit means, wherein said control circuit means consists of circuit means responsive solely to the unfiltered, rectified input for providing an output controlling signal whenever the input is above a first given level during upswings thereof and during downswings thereof until a second given level different from the first given level is reached and control means receiving the output controlling signal and responsive to absence of the output controlling signal for developing the control signal only at times when the unfiltered input reaches the second given level during downswings, wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; and OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and a fifth transistor each having a base, a collector and an emitter, said emitters of said fourth transistor and said fifth transistor being coupled to said circuit reference point; a second resistor, said collector of said fourth transistor being connected to said base of said third transistor, and via second resistor, to said bus means; a third resistor and a fourth resistor, said third resistor being connected between said collector of said fourth transistor and said base of fifth transistor and said fourth resistor being connected between said bus means and each of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series between a circuit point defined by a connection between said fifth resistor and said sixth resistor and said circuit reference point.

8. The off-line power supply according to claim 7, wherein said means for providing an unfiltered, rectified input comprises a half wave rectifier.

9. The off-line power supply according to claim 7, wherein said means for providing an unfiltered, rectified input comprises a full wave rectifier.

10. The off-line power supply according to claim 7, wherein said means responsive to the control signal comprises at least one silicon-controlled-rectifier having its control electrode arranged to receive the control signal.

11. The off-line power supply according to claim 7, wherein said means responsive to the control signal includes a first silicon-controlled-rectifier having its control electrode arranged to receive the control signal and a second silicon-controlled-rectifier having its control electrode arranged to receive a firing input from said first silicon-controlled-rectifier.

12. An off-line power supply comprising smoothing circuit means; means for producing an unfiltered, rectified input; control circuit means responsive solely to the unfiltered, rectified input for developing a control signal during a portion of decreasing swings of the unfiltered, rectified input; and means responsive to the control signal for developing current pulses during a portion of the decreasing swings, said means for developing current pulses including means for coupling the current pulses to said smoothing circuit means, wherein said control circuit means consists of circuit means responsive solely to the unfiltered, rectified input for providing an output controlling signal whenever the input is above a first given level during upswings thereof and during downswings thereof until a second given level different from the first given level is reached and control means receiving the output controlling signal and responsive to absence of the output controlling signal for developing the control signal only at times when the unfiltered input reaches the second given level during downswings, and further including means responsive to terminal voltage of its output for developing a further control signal for preventing conduction of said means responsive to the first-mentioned control signal whenever the terminal voltage of the output is at least substantially equal to a given value.

13. A current regulating circuit comprising means for providing an unfiltered, rectified input; control circuit means responsive solely to the unfiltered, rectified input for developing a control signal during a portion of decreasing swings of the unfiltered, rectified input; and means responsive to the control signal for passing current during a portion of the decreasing swings, wherein said control circuit means consists of circuit means responsive solely to the unfiltered, rectified input for providing an output controlling signal whenever the input is above a first given level during upswings thereof and during downswings thereof until a second given level different from the first given level is reached and control means receiving the output controlling signal and responsive to absence of the output controlling signal for developing the control signal only at times when the unfiltered input reaches the second given level during downswings.

14. A current regulating circuit according to claim 13, wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; an OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and a fifth transistor each having a base, a collector and an emitter, said emitters of said fourth transistor and said fifth transistor being coupled to said circuit reference point; a second resistor, said collector of said fourth transistor being connected to said base of said third transistor, and via said second resistor, to said bus means; a third resistor and a fourth resistor, said third resistor being connected between said collector of said fourth transistor and said base of fifth transistor and said fourth resistor being connected between said bus means and each of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series between a circuit point defind by a connection between said fifth resistor and said sixth resistor and said circuit reference point.

15. The current regulating circuit according to claim 13, wherein said means for providing an unfiltered, rectified input comprises a half wave rectifier.

16. The current regulating circuit according to claim 13, wherein said means for providing an unfiltered rectifier input comprises a full wave rectifier.

17. The current regulating circuit according to claim 13, wherein said means responsive to the control signal comprises at least one silicon-controlled-rectifier having its control electrode arranged to receive the control signal.

18. The current regulating circuit according to claim 13, wherein said means responsive to the control signal includes a first silicon-controlled-rectifier having its control electrode arranged to receive the control signal and a second silicon-controlled-rectifier having its control electrode arranged to receive a firing input from said first silicon-controlled-rectifier.

19. A battery charging or forming circuit comprising means across which a battery to be charged or formed is to be placed; means for providing an unfiltered, rectified input; control circuit means responsive to the unfiltered, rectified input for developing a control signal during a portion of decreasing swings of the unfiltered, rectified input; and means responsive to the control signal for passing current pulses to said means across which a battery is to be placed during a portion of the decreasing swings, wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; an OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and a fifth transistor each having a base, a collector and an emitter, said emitters of said fourth transistor and said fifth transistor being coupled to said circuit reference point; a second resistor, said collector of said fourth transistor being connected to said base of said third transistor and, via said second resistor, to said bus means; a third resistor and a fourth resistor, said third resistor being connected between said collector of said fourth transistor and said base of fifth transistor and said fourth resistor being connected between said bus means and each of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series between a circuit point defnded by a connection between said fifth resistor and said sixth resistor and said circuit reference point.

20. An off-line power supply comprising smoothing circuit means; means for producing an unfiltered, rectified input; control circuit means responsive to the unfiltered, rectified input for developing a control signal during a portion of decreasing swings of the unfiltered, rectified input; and means responsive to the control signal for developing current pulses during a portion of the decreasing swings, said means for developing current pulses including means for coupling the current pulses to said smoothing circuit means, wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; an OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and a fifth transistor each having a base, a collector and an emitter, said emitters of said fourth transistor and said fifth transistor being coupled to said circuit reference point; a second resistor, said collector of said fourth transistor being connected to said base of said third transistor and, via said second resistor, to said bus means; a third resistor and a fourth resistor, said third resistor being connected between said collector of said fourth transistor and said base of fifth transistor and said fourth resistor being connected between said bus means and each of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series between a circuit point defined by a connection between said fifth resistor and said sixth resistor and said circuit reference point.

21. A current regulating circuit comprising means for providing an unfiltered, rectified input; control circuit means responsive to the unfiltered, rectified input for developing a control signal during decreasing swings of the unfiltered, rectified input; means responsive to the control signal for passing current during a portion of the decreasing swings, wherein said control circuit means comprises circuit means responsive to the unfiltered, rectified input for providing an output controlling signal whenever the input is above a first given level during upswings thereof and during downswings thereof until a second given level different from the first given level is reached, and a control means responsive to absence of the output controlling signal for developing the control signal at times when the unfiltered input reaches the second given level during downswings, wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; and OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and a fifth transistor each having a base, a collector and an emitter, said emitters of said fourth transistor and said fifth transistor being coupled to said circuit reference point; a second resistor, said collector of said fourth transistor being connected to said base of said third transistor and, via said second resistor, to said bus means; a third resistor and a fourth resistor, said third resistor being connected between said collector of said fourth transistor and said base of fifth transistor and said fourth resistor being connected between said bus means and eahh of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series betweeen a circuit point defined by a connection between said fifth resistor and said sixth resistor and said circuit reference point.

22. A current regulating circuit comprising means for providing an unfiltered, rectified input; control circuit means responsive to the unfiltered, rectified input for developing a control signal during decreasing swings of the unfiltered, rectified input; and means responsive to the control signal for passing current during a portion of the decreasing swings, wherein said means for providing an unfiltered, rectified input includes a circuit reference point and bus means on which the unfiltered, rectified input appears; and wherein said control circuit means includes a first transistor having a base, collector and emitter, its collector-emitter path being coupled between the circuit reference point and said bus means; an OR function circuit including a first resistor, a second transistor and a third transistor having their emitters coupled to the circuit reference point and their collectors connected to said bus means via said first resistor, said base of said first transistor being connected to said collectors of said second transistor and said third transistor; a fourth transistor and a fifth transistor each having a base, a collector and an emitter, said emitters of said fourth transistor and said fifth transistor being coupled to said circuit reference point; a second resistor, said collector of said fourth transistor being connected to said base of said third transistor, and via said second resistor, to said bus means; a third resistor and a fourth resistor, said third resistor being connected between said collector of said fourth transistor and said base of fifth transistor and said fourth resistor being connected between said bus means and each of said collector of said fourth transistor and said base of said third transistor; a fifth resistor and a sixth resistor, said fifth resistor and said sixth resistor being connected in series between said bus means and said collector of said fifth transistor; and a seventh resistor and a Zener diode connected in series between a circuit point defined by a connection between said fifth resistor and said sixth resistor and said circuit reference point.

* * * * *